(12) United States Patent
Le Tuan (10) Patent No.: US 7,327,368 B2
(45) Date of Patent: Feb. 5, 2008

(54) METHODS AND APPARATUS FOR SUPPORTING AND IMPLEMENTING COMPUTER BASED ANIMATION

(75) Inventor: Phac Le Tuan, San Jose, CA (US)

(73) Assignee: Paceworks, Inc., Los Gatos, CA (US)

( * ) Notice: Subject to any disclaimer, the term of this patent is extended or adjusted under 35 U.S.C. 154(b) by 112 days.

(21) Appl. No.: 11/202,465

(22) Filed: Aug. 11, 2005

(65) Prior Publication Data

US 2005/0270294 A1    Dec. 8, 2005

Related U.S. Application Data

(63) Continuation-in-part of application No. 09/500,702, filed on Feb. 9, 2000, now Pat. No. 6,956,574, which is a continuation-in-part of application No. 08/891,038, filed on Jul. 10, 1997, now abandoned.

(60) Provisional application No. 60/119,369, filed on Feb. 9, 1999.

(30) Foreign Application Priority Data

Feb. 13, 2003    (DE) .......................... 203 02 344 U (51) Int. Cl.
*G06T 13/00* (2006.01)

(52) U.S. Cl. ...................... 345/473; 345/474; 345/475

(58) Field of Classification Search ................ 345/473, 345/474, 475
See application file for complete search history.

(56) References Cited

U.S. PATENT DOCUMENTS 5,856,830 A * 1/1999 Yamamoto .................. 345/474

OTHER PUBLICATIONS

Rist et al. "Adding Animated Presentation Agents to the Interface", ACM, Jan. 1997; pp. 79-86.*

* cited by examiner

*Primary Examiner*—Kimbinh T. Nguyen
(74) *Attorney, Agent, or Firm*—LaRiviere, Grubman & Payne, LLP (57) ABSTRACT

The present invention provides a method for hierarchically decomposing a visual or audio object within an animation into plurality of objects which can be individually edited to achieve particular animation effects. For example, a graphical object may be decomposed into a plurality of graphical sub-objects, each of which inherits an anchor point from the original object, or is given an original anchor point distinct from the original object. Each sub-object also includes a relative position for the sub-object relative to the anchor point. The path of the anchor point is combined with relative positions of the sub-objects to produce an animation for the object as a whole. This decomposition technique can greatly increase computational efficiency of an animation. It also provides for inheritance of attributes between objects and descendent sub-objects. The objects may support functions, or behaviors, such as morphing or motion blurring. The present invention additionally provides a flexible grouping operation to facilitate modifications to a group of objects. When a first type of modification is made to an attribute of an object in a group, this change is applied to corresponding attributes of other objects in the group. When a second type of modification is made to an attribute of an object in a group, the change only applies to the selected object or objects, and not to other objects in the group. The present invention allows objects to be manipulated on servers which are connected to a display on the internet.

2 Claims, 10 Drawing Sheets

$$M = M\_ANCHOR * M\_RESIZE * M\_SKEW * M\_ROTATE * M\_TRANSLATE$$

$$M\_ANCHOR = \begin{bmatrix} 1 & 0 & 0 \\ 0 & 1 & 0 \\ XANCHOR & YANCHOR & 1 \end{bmatrix}$$

$$M\_RESIZE = \begin{bmatrix} XRESIZE & 0 & 0 \\ 0 & YRESIZE & 0 \\ 0 & 0 & 1 \end{bmatrix}$$

$$M\_SKEW = \begin{bmatrix} 1 & YSKEW & 0 \\ 0 & 1 & 0 \\ 0 & 0 & 1 \end{bmatrix}$$

$$M\_ROTATE = \begin{bmatrix} COS(BETA) & SIN(BETA) & 0 \\ -SIN(BETA) & COS(BETA) & 0 \\ 0 & 0 & 1 \end{bmatrix}$$

$$M\_TRANSLATE = \begin{bmatrix} 1 & 0 & 0 \\ 0 & 1 & 0 \\ XPOSITION & YPOSITION & 1 \end{bmatrix}$$

METHODS AND APPARATUS FOR SUPPORTING AND IMPLEMENTING COMPUTER BASED ANIMATION

RELATED APPLICATIONS

This application is a continuation-in-part of application Ser. No. 09/500,702 filed Feb. 9, 2000 now U.S. Pat. No. 6,956,574 which claims priority to Continuation-in-Part application Ser. No. 08/891,038 filed Jul. 10, 1997 now abandoned and claims priority to provisional Application Ser. No. 60/119,369, filed Feb. 9, 1999.

TECHNICAL FIELD

The present invention relates to computer-generated animation, and more particularly to a system which provides facilities for hierarchical decomposition of visual and audio elements within a computer generated animation to facilitate editing and creation of the animation.

BACKGROUND ART

Along with the increasing use of computer-generated animation, a number of computer-based animating tools have been developed which allow animators to more easily specify and manipulate computer-based animations.

One particularly cumbersome task is to specify the behavior of large groups of independently moving or evolving objects within a computer animation. Existing tools for producing computer-generated animation require the behavior of individual objects to be specified individually. This can require a great deal of time for a large number of objects. Furthermore, much of the effort involved in individually specifying the actions of objects is wasted for groups of objects, such as a school offish, which individually exhibit similar or predictable behavior.

Editors for non-animated graphical objects such as the MacDraw program, produced by Apple Computer Corporation of Cupertino, Calif., allow groups of graphical objects within a graphical image to be combined together into a "group." Subsequent editing operations performed on the "group" are applied to all elements of the group. For example, if the position of an object within a group is changed, corresponding positions for other objects within the group are changed in the same way. In another example, if the vertical dimension of an object within a group is stretched by a factor of two, the vertical dimensions of all other objects in the group are similarly stretched in the vertical dimension by a factor of two. This grouping feature of graphical editors such as MacDraw can significantly simplify the manipulation of groups of graphical objects within a graphical image. However, such grouping operations have so far been applied only to non-moving graphical images, not animations.

Furthermore, such grouping operations are relatively inflexible in the way that objects within a group are modified. In order to edit an attribute of an object within a group without editing corresponding attributes of the other objects within the group, the group must be "ungrouped," before the object can be individually edited, and the objects must subsequently be regrouped. This is an awkward and time-consuming process.

What is needed is an editing tool for creating computer-generated animation which allows an original object to be decomposed into a group of objects.

Additionally, what is needed is an editing tool for creating computer-generated animation which allows groups of objects to be manipulated collectively while providing a flexible method for easily modifying attributes of individual objects within the group.

When adding a static annotation of an existing image, there are key considerations to keep into account in order to obtain a meaning result:

Avoid hiding meaningful areas of the image

Make sure the annotated text is appropriately legible

Convey the additional meaning in the most effective way

For the purpose of describing the ideas behind this invention, we will extend the concept of a static annotation to an Animated Text Sequence (ATS) in the following way:

An Animated Text Sequence starts with a collection of glyphs, letters, words, or other text components, appearing individually or collectively in a certain order and graphically rendered with certain effects, with such effects evolving over time in any fashion, and resulting in a final frame that is similar to a static annotation where a subset of, or the full content of, the original text sequence can be read.

When such an ATS is added to an existing image, additional constraints appear compared to the considerations mentioned above for a static annotation:

Ensure that the constraints from the static case are preserved as much as possible for each individual frame of the animation;

Integrate the animated text sequence within the spatial structure of the image;

Take advantage of certain text animation styles (TAS) to convey additional meaning thanks to the use of appropriate kinetic typography principles.

DISCLOSURE OF THE INVENTION

The present invention provides a method and an apparatus for producing computer-generated animation which allows an original visual or audio object in an animation to be divided into a plurality of sub-objects to be individually edited such that the sub-objects inherit characteristics and attributes of the original object. The invention further allows sub-objects to be decomposed into sub-sub-objects in a hierarchical fashion creating many levels of sub-objects.

The present invention also allows a collection of objects to be grouped together in a flexible way so that a persistent selection mechanism is created for the group of objects. This selection mechanism provides for two types of modifications of objects within the group. When an attribute of a selected object is modified, a first type of modification similarly modifies corresponding attributes of other objects in the group. A second type of modification only modifies the attribute of the selected object, and does not modify the corresponding attributes of other objects in the group. By providing for these two types of modifications, the present invention allows the attributes of a group of objects to be modified either collectively or individually. These two types of modifications may be used to modify a single parameter. For example, a first type of modification modifies the color of an object locally so that it modifies only the color of a single object in a group, while a second type of modification modifies the color of all objects in the group.

Thus, the present invention can be characterized as a method for creating a display of an object, comprising: decomposing the object into a plurality of sub-objects; representing the position of a sub-object as a position of an anchor point, and a relative position of the sub-object relative to the anchor point; determining the position of the anchor point at a time T; determining the relative position of the sub-object at the time T; combining the position of the anchor point and the relative position of the sub-object into a position for the sub-object at time T; using this position to construct a graphical representation of the object at time T; and outputting the graphical representation to a display device.

According to one aspect of the present invention, sub-objects automatically inherit characteristics of the object.

According to another aspect of the present invention, a plurality of aphical displays of the object are created and outputted to the display device at a plurality of sequential points in time to create an animated display of the object.

The present invention may also be characterized as a method for editing an object, comprising: decomposing the object into a plurality of sub-objects through a user interface, such that the plurality of sub-objects automatically inherit characteristics of the object; and separately editing sub-objects in the plurality of sub-objects through the user interface.

The present invention can also be characterized as a method for editing a plurality of objects through a user interface, comprising: displaying a group of objects to the user interface; selecting a plurality of objects from the group through a user interface; establishing a relationship between the plurality of objects, such that, a first type of modification of an attribute of an object similarly modifies a corresponding attribute of other objects in the plurality of objects, and a second type of modification of an attribute of an object modifies only the attribute of the object, and not corresponding attributes of other objects. According to an aspect of the present invention, the first type of modification is performed through a first window in the user interface, and the second type of modification is performed through a second window in the user interface.

The present invention can also be characterized as a method for creating a visual animation effect, comprising: selecting an original object; dividing the original object into a plurality of sub-objects; animating sub-objects separately; after the sub-objects have been separately animated, recombining the sub-objects into the original object.

According to one aspect of the present invention, the method includes applying global transformations to the plurality of sub-objects before the recombining of the sub-objects into the original object.

Embodiments of the invention include a web-based computer system for animating text, wherein the computer system comprises: a web browser which displays a form for entering a text, and one or more icons for representing behaviors for the text; a web server coupled to a text animation engine, such that the text animation engine includes an object-oriented data structure for representing the text, and each character in the text is represented by an object in the object-oriented data structure.

Embodiments of the invention include a method of watermarking a sequence of animated text, the method comprising: inputting a sequence of text characters from a form on a web browser; creating a plurality of objects to animate the sequence of text characters, wherein the objects are created on a server coupled to the web browser via the Internet; displaying the animated sequence of text characters on the web browser, such that a character in the sequence is displayed in a manner differing from user specifications; receiving electronic payment via the web browser; and redisplaying the animated sequence of text characters in response to the payment, such that the animated sequence is displayed on the browser in accordance with user specifications.

In embodiments of the invention, the web browser resides on a cellular phone. In other embodiments, the web browser resides on an electronic personal digital assistant. In some embodiments, the web browser resides on a web pad, which comprises a wireless device capable of accessing web page.

Embodiments of the invention include methods for applying a behavior to an object or a group of objects. In embodiments of the invention, a user may drag a behavior icon on top of an object or a group of objects. Embodiments of the invention support multiple inheritance. To perform multiple inheritance, a user may drag and drop an icon from two or more objects onto a single object.

Embodiments of the invention include a method of watermarking a sequence of animated text, the method comprising: inputting a sequence of text characters from a form on a web browser; creating a plurality of objects to animate the sequence of text characters, wherein the objects are created on a server coupled to the web browser via the Internet; displaying the animated sequence of text characters on the web browser, such that a character in the sequence is displayed in a manner differing from user specifications; receiving electronic payment via the web browser; and redisplaying the animated sequence of text characters in response to the payment, such that the animated sequence is displayed on the browser in accordance with use specifications.

Embodiments of the invention include a method of generating a motion-blur effect in an animated text character, wherein the animated character is displayed in a sequence of frames on a computer screen. In embodiments of the invention the method comprises the following steps: selecting a frame from the sequence of frames; taking a plurality of sample images for the frame; selecting a display feature of the text character for blurring over the plurality of sample images; averaging the display feature over the plurality of sample images; and displaying the text character in the frame with the averaged feature. In embodiments of the invention the display feature is an RGB value of pixels in the plurality of samples. In alternative embodiments, the display feature is an HLS value of pixels in the plurality of samples. In some embodiments the display feature is an HIV value of pixels in the plurality of samples.

An embodiment of the invention includes a method of generating a motion blur effect in an animated text sequence. The text sequence may include a plurality of characters, such that the animated text sequence is displayed in a sequence of frames on a computer display. The computer display is coupled to an animation server. In an embodiment of the invention, the method comprises creating a first object on the animation server, wherein the first object stores a first character in the plurality of characters; creating a second object on the animation server, the second object storing a second character in the plurality of characters; and blurring the first character on the display, wherein the first character is blurred by a blurring function contained in the first object. In some embodiments the second character is not blurred. In embodiments, the first character is blurred to a degree proportional to its velocity. In other embodiments, the first character is blurred in a direction corresponding to its path.

An embodiment is aimed at solving the problem of dynamically annotating a given image with an animated text in a way that can preserve the visual integrity of the original image and/or effectively convey an additional dimension of meaning to the original image.

One example of application is a natural extension to the common usage of adding a short text on a picture of a group of people in order to suggest potential thoughts or words coming from one or several individuals in the picture.

Other aspects and advantages of the present invention can be seen upon review of the figures, the description, and the claims which follow.

MODES FOR CARRYING OUT THE INVENTION

The following description is presented to enable any person skilled in the art to make and use the invention, and is provided in the context of a particular application and its requirements. Various modifications to the disclosed embodiments will be readily apparent to those skilled in the art and the general principles defined herein may be applied to other embodiments and applications without departing from the spirit and the scope of the present invention. Thus, the present invention is not intended to be limited to the embodiments shown, but is to be accorded the widest scope consistent with the principles and features disclosed herein.

Figure 1:
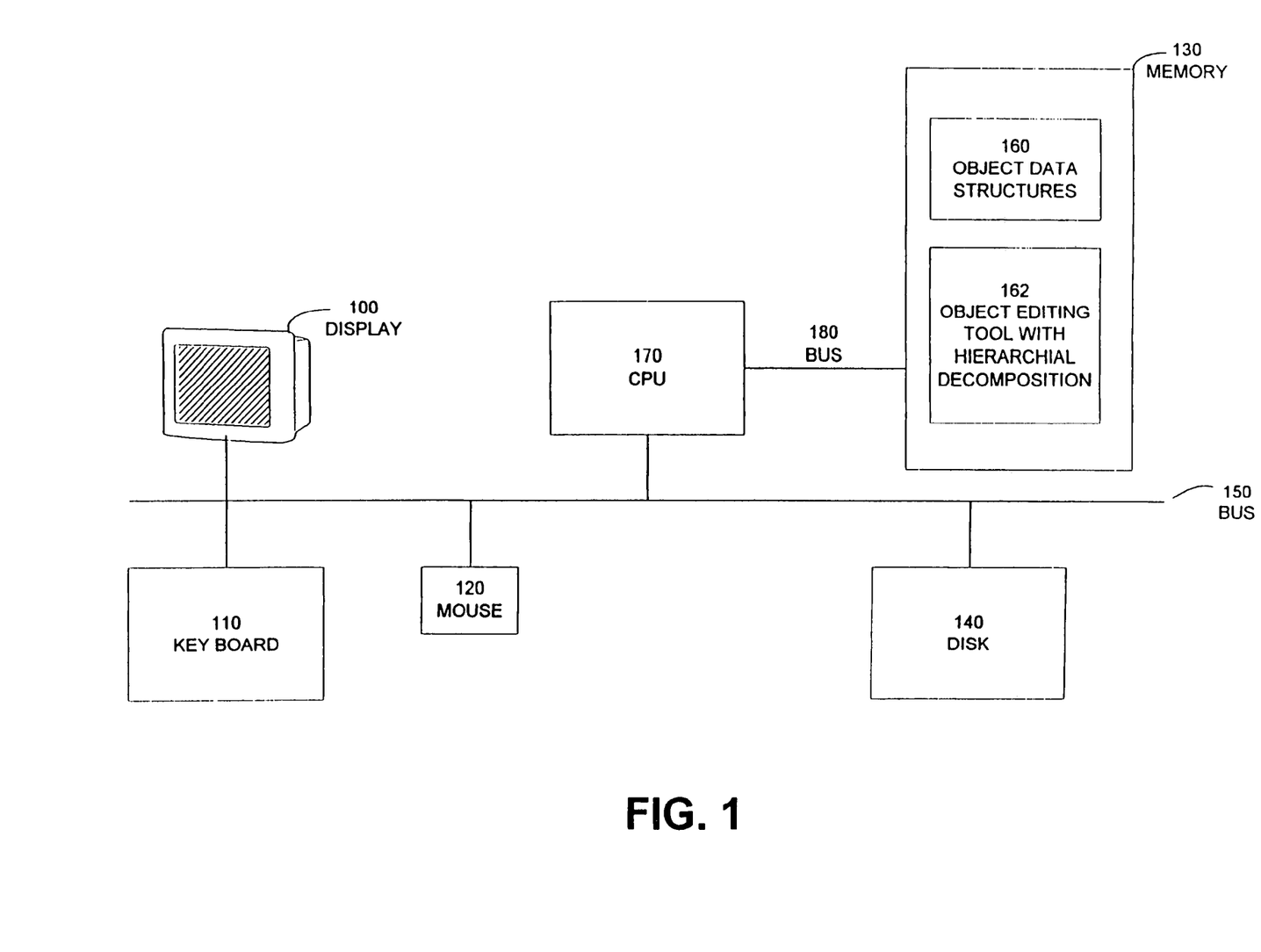
FIG. 1 is a block diagram illustrating some of the major functional components of a computer system containing object editing tool with hierarchical decomposition 162 and object data structures 160 in accordance with an aspect of the present invention.

FIG. 1 is a block diagram illustrating a computer system including resources to produce a computer-generated animation in accordance with an aspect of the present invention. FIG. 1 includes display 100, keyboard 110, mouse 120, disk 140 and CPU 170, which are connected together through bus 150, which is an I/O bus. CPU 170 additionally connects to memory 130 through bus 180, which is a faster processor-to-memory bus. Display 100 is a display device, such as a computer monitor, for displaying the computer animation. Keyboard 110 and mouse 120 are input devices for accepting user input into the computer system. Memory 130 and disk 140 are storage devices for storing programs and data for producing computer-generated animations. CPU 170 is a central processing unit which: accepts user input from keyboard 110 and mouse 120; processes programs and data stored within memory 130 and disk 140; and produces output for display 100. Memory 130 contains object data structures 160, which are data structures corresponding to audio and visual objects associated with an animation. Memory 130 additionally contains an object editing tool with hierarchical decomposition 162, which is an editing tool that allows audio and visual objects associated with an animation to be hierarchically decomposed and edited to produce an animation.

Figure 2:
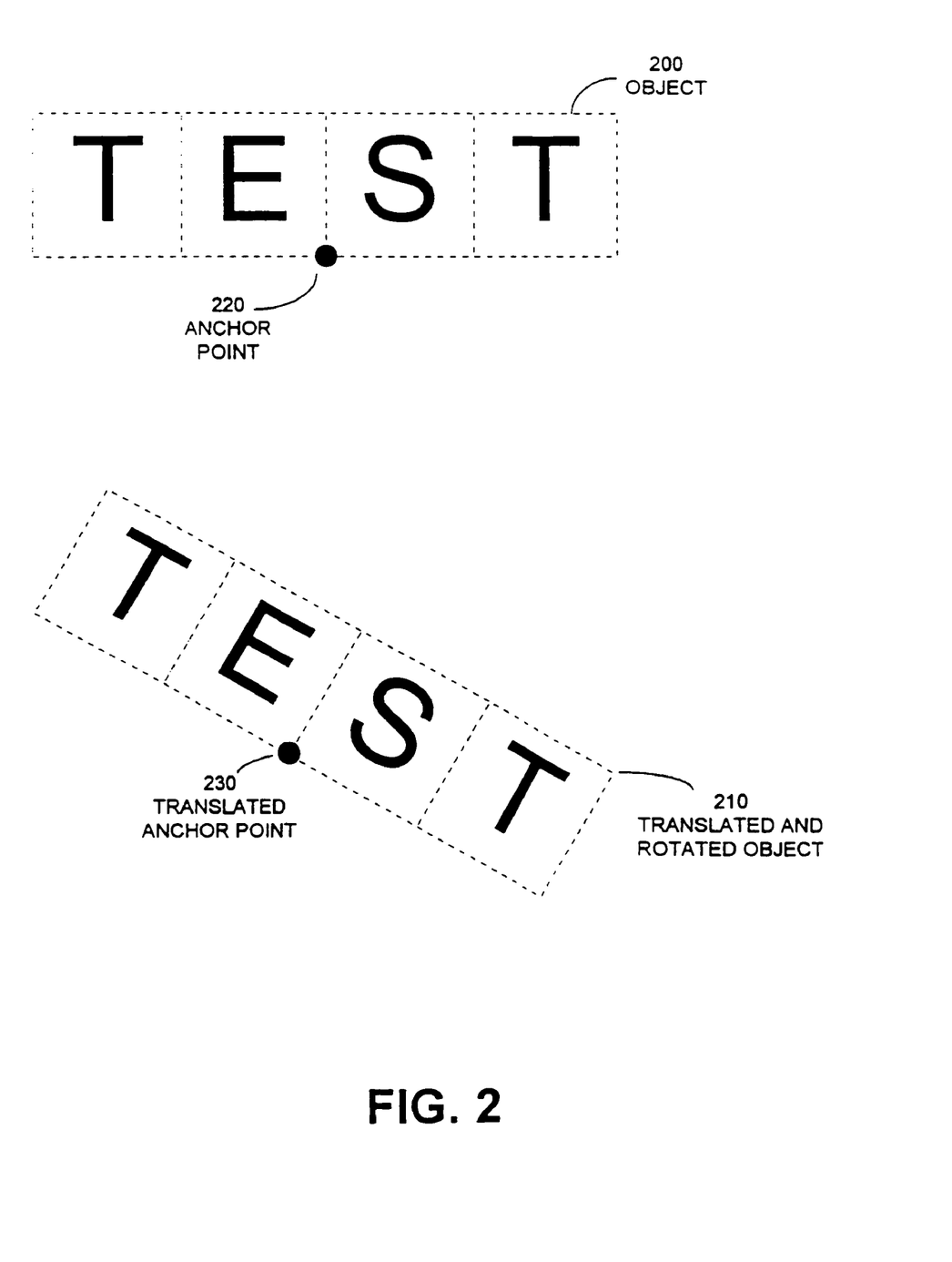
FIG. 2 is a diagram illustrating an example in which a word is decomposed into constituent characters, and the characters are individually animated in accordance with an aspect of the present invention.

FIG. 2 illustrates the decomposition of a word into individual characters in accordance with an aspect of the present invention. A graphical object is often a natural combination of elementary objects which are themselves compound objects. For example, a piece of text is composed of sentences, which are themselves composed of words, which are themselves composed of individual letters. Other graphical images, such as bit maps, can also be arbitrarily decomposed into individual fragments of any shape, such as the pieces of a jigsaw puzzle, a tessellation or vectorial objects, which can themselves be decomposed into sub-fragments. The rules used to carry out the decomposition process depend upon the type of targeted object.

Once an object is broken down or divided into elementary objects, which can be numerous, it is cumbersome to have to specify a separate behavior for each elementary object. It is therefore desirable to distribute the characteristics of an original compound object to each elementary object in an automatic way that facilitates the widest possible range of effects and yields the best performance.

For example, FIG. 2 illustrates an example of a four-letter word "TEST," which starts on a graphical display as object 200 and at a future time ends up as translated and rotated object 210 on the display. In order to perform the translation and the rotation of object 200, object 200 is first divided into individual letters, as is illustrated by the dashed lines surrounding the letters in object 200. The coordinates of each letter are specified with relation to an anchor point 220. More particularly, the movement from object 200 to translated and rotated object 210 can be expressed as a movement of anchor point 220 to translated anchor point 230, along with a rotation of the letters comprising object 200 with respect to anchor point 220. By separating the translation and rotation of letters comprising object 200 in this way, computations for the movement of object 200 are greatly simplified. Note that individual letters within object 200 automatically inherit the same anchor point 220.

By separating the translational and rotational components of the motion of object 200, a complex set of mathematical calculations is avoided. Without the separation into rotational and translational components, the path of a letter within a translating and rotating word is a cycloid, which is typically calculated by solving a set of a differential equations, which requires a tremendous amount of computation. Furthermore, if the distance of an object to the center of rotation also varies in time, the solution of a corresponding set of equations to describe the motion of the object becomes quite complex. When the translational and rotational components are separated, the path of an individual letter within object 200 can be easily expressed as a translation of the anchor point, and a rotation about the anchor point, both of which can be calculated through simple matrix operations.

Another interesting effect can be achieved by giving each letter an independent anchor point at the geometric center of the letter, about which the letter rotates.

Figure 3:
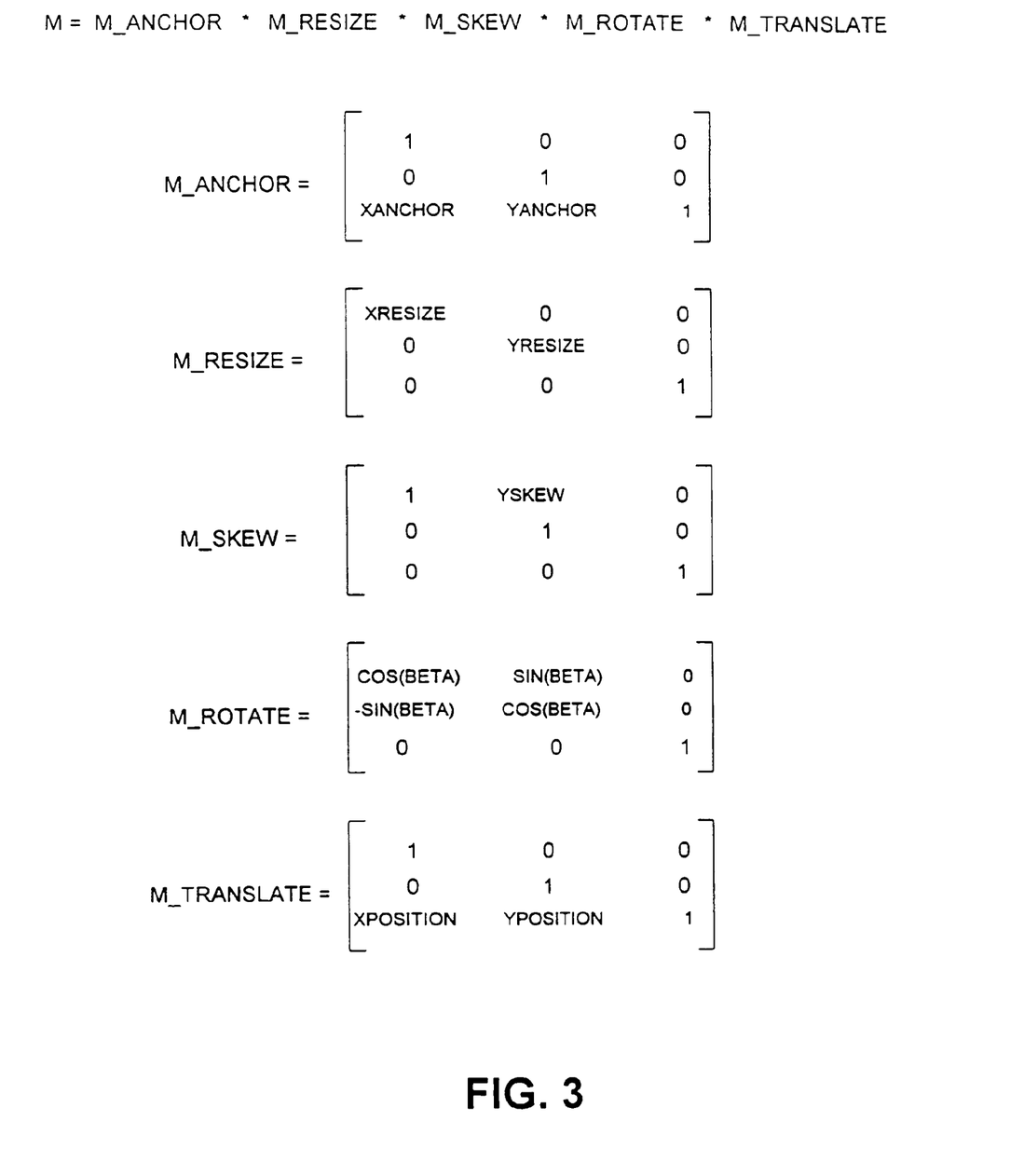
FIG. 3 is a diagram illustrating how spatial manipulations of an object are divided into a set of orthogonal matrix operations in accordance with an aspect of the present invention.

FIG. 3 illustrates how transformations of spatial locations in two dimensions can be expressed as a product of five orthogonal 3×3 matrices in accordance with an aspect of the present invention. In the top line of FIG. 3, transformation matrix M is a product of five separate orthogonal matrices: M_anchor, M_resize, M_skew, M_rotate and M_translate. Matrix M_anchor specifies a translation in both X and Y dimensions for an anchor point. Recall that for matrix operations an identity matrix has 1's on all of the diagonal elements from the top left-hand corner to the bottom right-hand corner, and has 0's in all other elements. In the case of matrix M_anchor, there is an additional X translation component for translation of the anchor point, on the lower left-hand side of the matrix, and an additional Y translation component on the middle column of the bottom row of the matrix. Matrix M_resize rescales an object in both the X and Y dimensions. Matrix M_resize includes an X scale factor in the upper left-hand corner, and a Y scale factor in the middle of the matrix. Matrix M_skew specifies a particular type of rotational warping of an object. The matrix M_skew is identical to the identity matrix except that it includes an additional Y skew component at the top of the middle column. Matrix M_rotate rotates an object by an angle p. Matrix M_rotate includes a cos(P) component in the upper right-hand corner, a cos(P) component in the middle element, a sin(P) component at the top of the middle column, and a -sin(P) component in the middle of the left-hand column. Matrix M_translate performs a translation of the object with respect to the anchor point. Like the matrix M_anchor, matrix M_translate has 1's along the diagonal from the upper left-hand corner to the right lower right-hand corner, an X translation element at the bottom of the left column, and a Y translation element at the bottom of the middle column. Note that the example in FIG. 3 does not include any perspective components since the upper element of the right-hand column and the middle element of the right-hand column are zero for all the matrices in FIG. 3. Also note that when two or more matrices are multiplied together to obtain a cumulative result, the transformations of the constituent matrices are accumulated. Note that matrix multiplication is not a commutative operation. Consequently, the order in which matrices are multiplied can change the result of a series of matrix operations.

Figure 4:
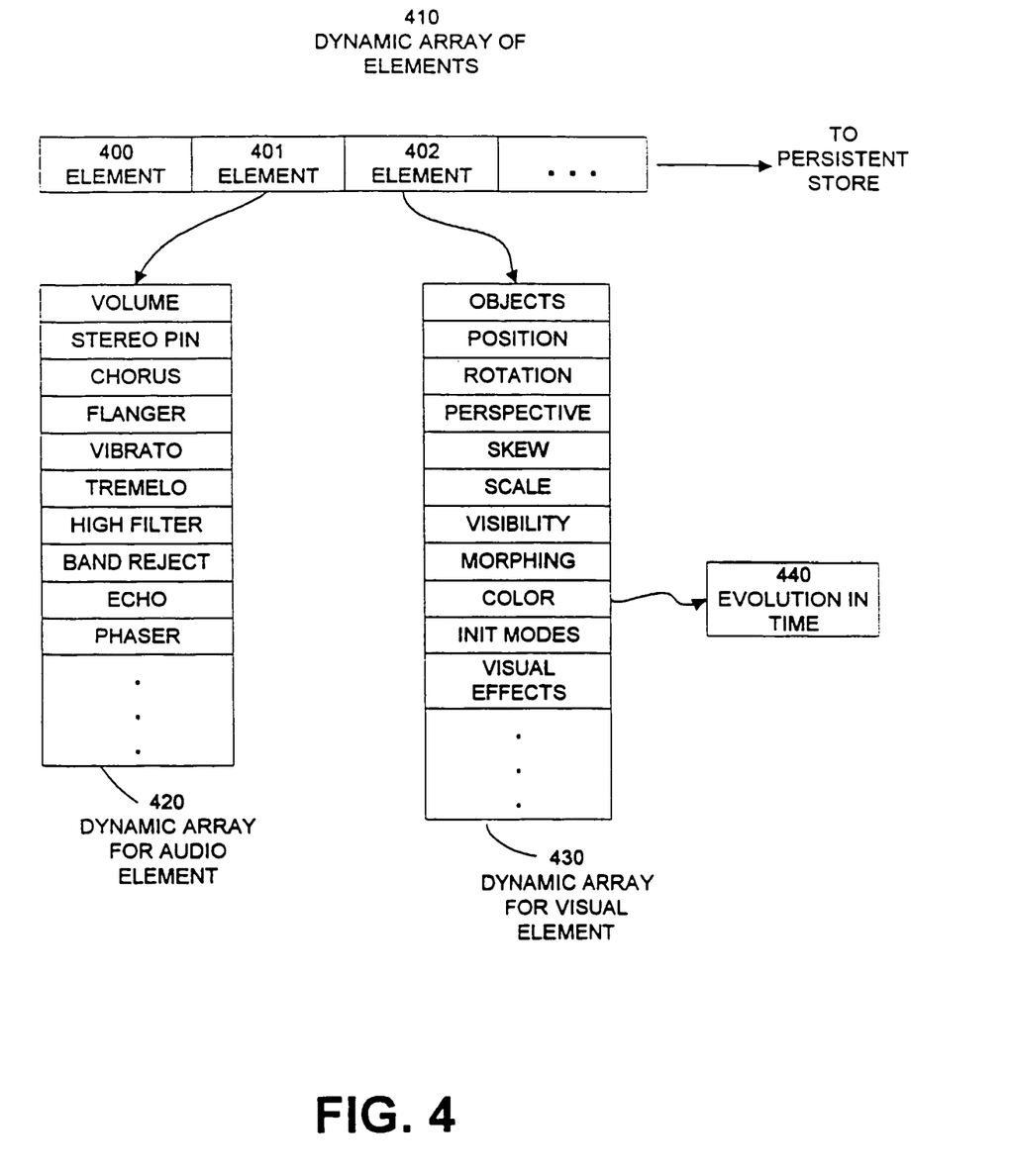
FIG. 4 is a diagram illustrating the data structures used to represent audio and visual elements within an animation in accordance with an aspect of the present invention.

FIG. 4 illustrates the data structures involved in specifying visual and audio elements of an animation in accordance with an aspect of the present invention. Dynamic array of elements 410 contains a plurality of audio and visual elements involved in the animation. In this example, dynamic array of elements 410 includes elements 400, 401 and 402. These elements can be stored to and subsequently retrieved from a persistent store such as an object-oriented database management system. In the embodiment illustrated in FIG. 4, an element is a member of a C++ class, which propagates attributes through inheritance to other elements derived from the element. In FIG. 4, element 401 is an audio element, which includes a dynamic array 420 which is associated with the audio element. As is shown in FIG. 4, dynamic array 420 includes attributes such as volume, stereo pan, chorus, flanger, vibrato, tremelo, high filter, band reject, echo and phaser. Other embodiments include other commonly known audio attributes. Element 402 is a visual element, which includes a dynamic array 430 for visual element 402. Dynamic array 430 includes visual attributes that can be inherited by descendent objects. These attributes include:

position (in any dimension),
rotation,
perspective,
skew (about any axis),
scale (about any axis),
visibility (yes or no),
morphing,
color,
ink modes (or, xor, transparency, etc.),
visual effects (blur, sharp, dispersion, spherize, wave, twirl, etc.).

One embodiment of the present invention includes typographic attributes, such as: font size, font name, leading, tracking, Adobe multiple master and TrueType GX font variations and attributes, as well as classic attributes, such as bold, italic, underline, etc. Dynamic array 420 can be expanded to accommodate additional visual attributes as required.

For animation purposes, each attribute within an element is associated with an evolution in time, which is a member of an animation class. For example, in FIG. 4 element 402 includes an attribute called color which is associated with evolution in time 440. Evolution in time 440 provides a linkage between a particular time and a particular value. In one embodiment, evolution in time 440 is implemented as a function which determines how a color of a visual object evolves over time. Every other attribute within element 402 is similarly associated with an evolution in time, although some attributes may have evolutions that remain static over time.

Figure 5:
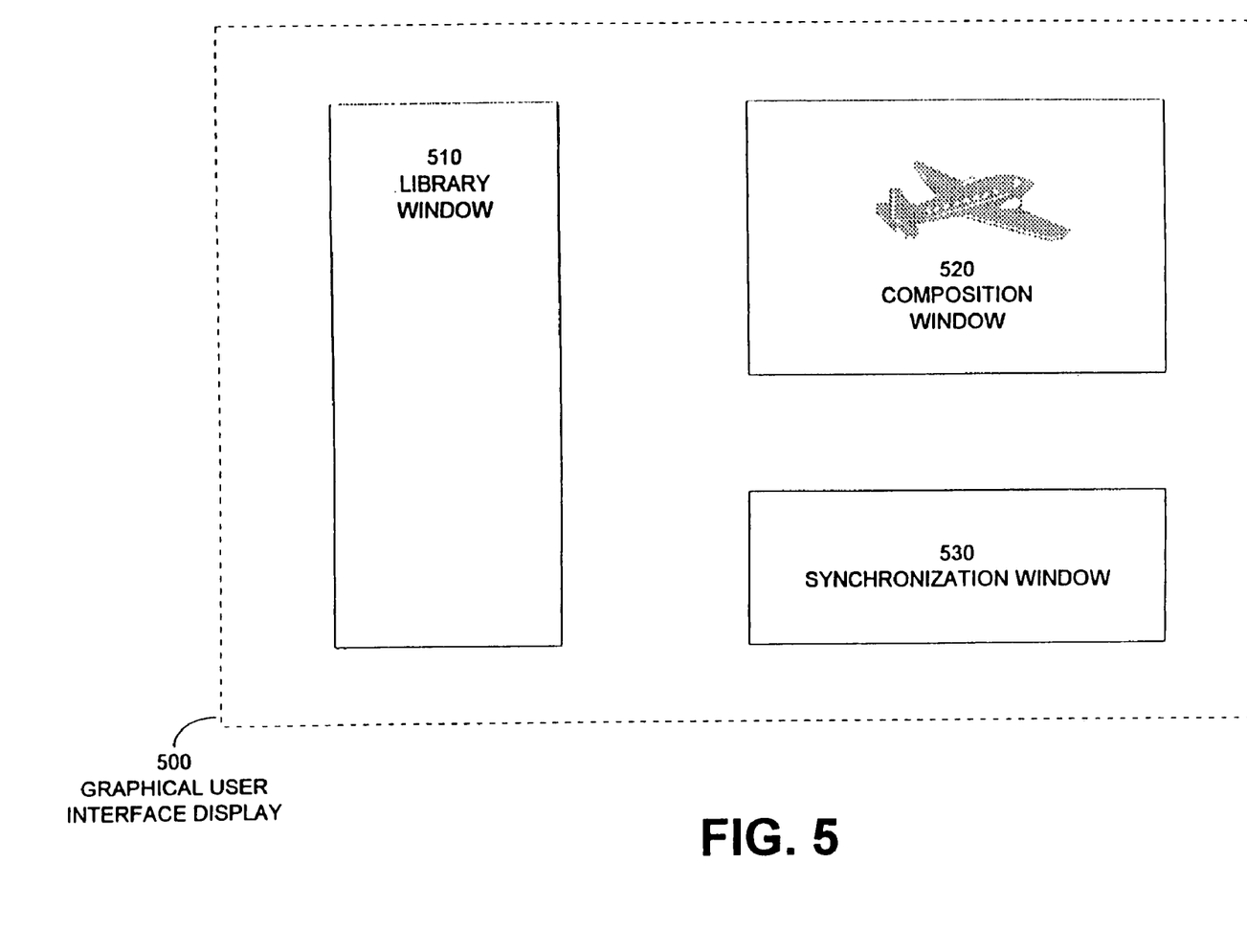
FIG. 5 is a diagram illustrating the layout of a graphical user interface for creating computer-generated animations in accordance with an aspect of the present invention.

FIG. 5 is a diagram illustrating the appearance of a graphical user interface display 500 for use in creating and editing an animation in accordance with an aspect of the present invention. FIG. 5 includes graphical user interface display 500, which contains library window 510, composition window 520 and synchronization window 530. Library window 510 is a user interface which provides access to a database containing objects to be used in an animation. Once an object is selected from library window 510, it can appear in composition window 520 and synchronization window 530 for editing. The appearance of an object can be edited in composition window 520, for example, by changing the color of an object or a group of objects. Other visual attributes can also be edited within composition window 520. Synchronization window 530 is a user interface which allows movements and attributes of different objects to be synchronized in time with each other.

One aspect of the present invention is a function called "group," which loosely groups objects together and creates a persistent selection mechanism for the group of objects collectively. In one embodiment of the present invention, a group may be modified in two ways. When a first type of modification is made to an attribute of an object in a group, a corresponding attribute in all other objects in the group is similarly modified. When a second type of modification is made to an attribute of an item in a group, the modification only applies to the selected object. For example, in one embodiment, as is illustrated in FIG. 5, when a change is made to any object of a group in synchronization window 530, the change applies only to that object. In contrast, when a change is made to an object of a group in composition window 520, then the change applies to all other objects in the group. In another example, if an anchor point is changed in the composition window 520, the change applies to all objects. Whereas, if a change is made to the anchor point in the synchronization window 530, the change only applies to one object. Finally, any viewing preference selected for an object in a group will apply to all objects in the group. The present invention greatly enhances productivity by allowing both collective and individual changes to be made through different windows without time-consuming ungrouping and grouping operations.

In another embodiment, a certain set of attributes are group attributes, for which any changes made to an individual object affect the entire group. Another group of attributes are individual attributes, for which changes made to an individual object do not affect other objects in the group. This type of a grouping feature does not require two separate windows. If a group attribute is modified, all other elements in the group are similarly modified. When an individual attribute is modified, only the attribute of the individual object is changed.

Figure 6:
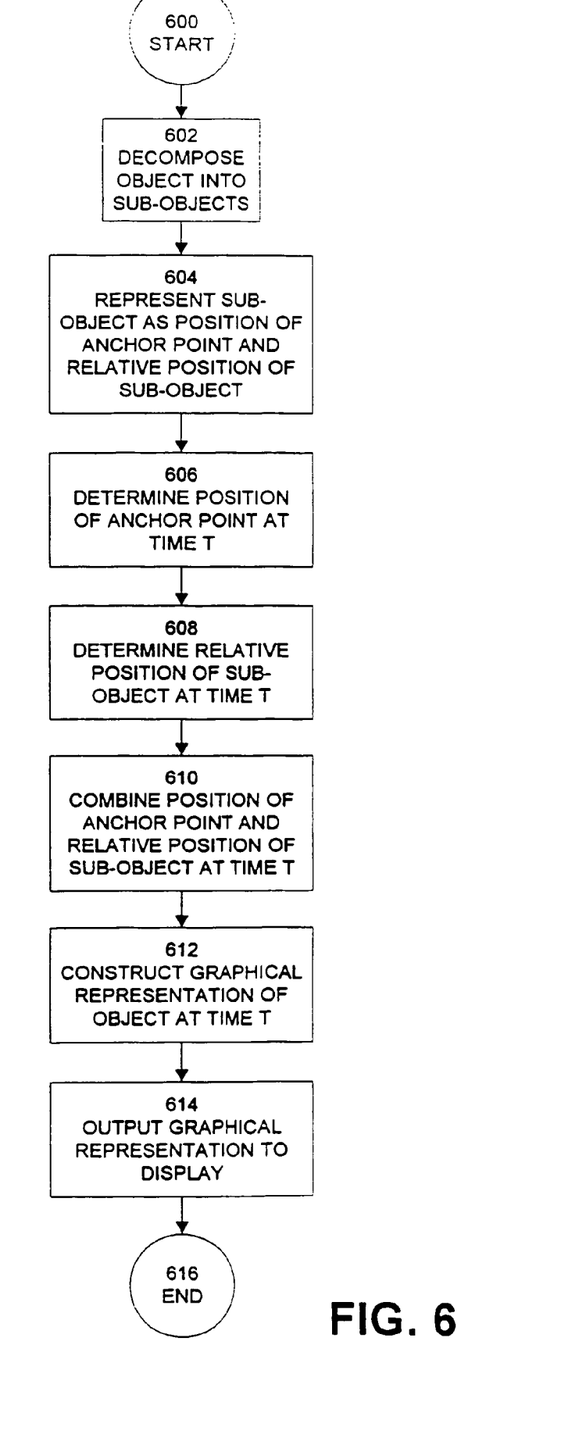
FIG. 6 is a flowchart illustrating the sequence of operations involved in decomposing an object into sub-objects and manipulating the sub-objects in accordance with an aspect of the present invention.

FIG. 6 is a flowchart illustrating the sequence of steps involved in decomposing and recombining an object to create animation effects in accordance with an aspect of the present invention. The system starts at step 600 which is a start state. The system next advances to step 602. At step 602, the object is decomposed into a plurality of sub-objects. The system next advances to step 604. At step 604, sub-objects are represented as a position of an anchor point, and a relative position of the sub-object. The system next advances to step 606. At step 606, the system determines the position of the anchor point at time T. The system next advances to step 608. At step 608, the system determines a relative position of a sub-object relative to the anchor point at time T. The system next advances to step 610. At step 610, the system combines the position of the anchor point, and the relative position of the sub-object at time T. For example, in the case of a system which uses matrix operations, the combination process includes multiplying a matrix representing an anchor point with a matrix representing a position of the sub-object relative to the anchor point. The system next advances to step 612. At step 612, the sub-objects are recombined to construct a graphical representation of the original object at time T. The system next advances to step 614. At step 614, the system outputs the graphical representation to a display. The system next advances to step 616 which is an end state. This process is iteratively repeated to create a sequence of graphical images comprising an animation.

The method for representing a sub-object as a position of an anchor point and a position of the sub-object relative to the anchor point can be generalized for other attributes besides position. For example, consider the attribute of color. An object may be decomposed into sub-objects, each of which inherit a baseline color intensity value representing a level of ambient lighting, which changes as a function of time. The sub-objects themselves may vary in color, for example, however this color variance is relative to the changing baseline color intensity value.

Figure 7:
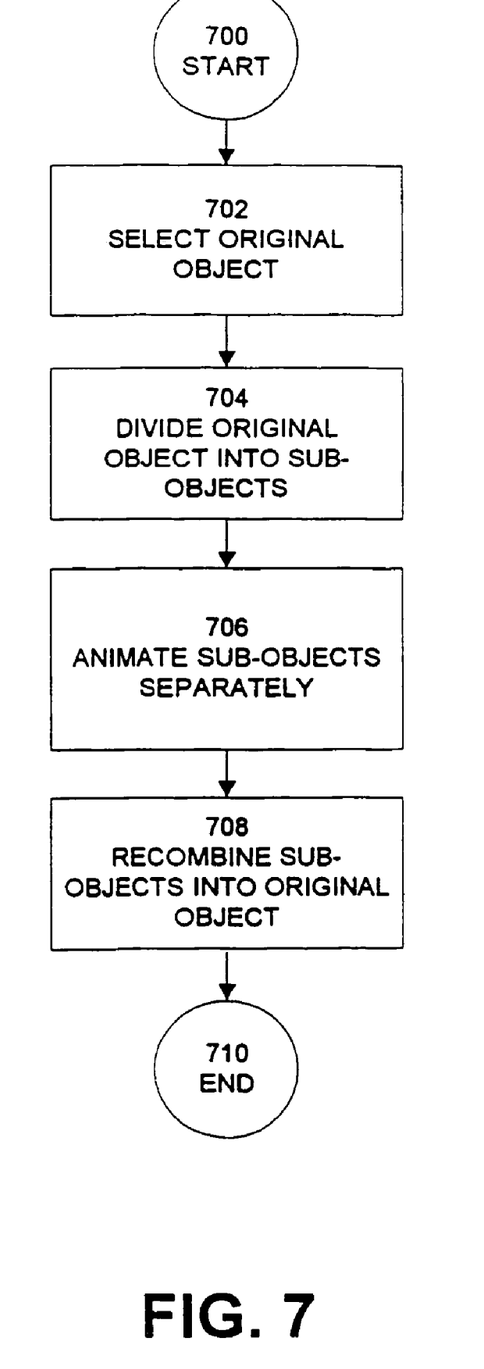
FIG. 7 is a flowchart illustrating a special effect which decomposes an object into a plurality of sub-objects which are separately animated before recombining into the original object in accordance with an aspect of the present invention.

FIG. 7 is a flowchart illustrating the sequence of operations involved in creating an animation effect in accordance with an aspect of the present invention. The system starts at step 700 which is a start state. The system next advances to step 702. At step 702, the system selects an original object to be decomposed. In one embodiment, this selection is performed automatically by the system. In another embodiment it is accomplished by obtaining user input from a user interface. The system next advances to step 704. At step 704, the system divides the original object into a plurality of sub-objects. This division may be accomplished automatically by the system or it may be accomplished by accepting input from a user interface. The system next advances to step 706. At step 706, the system animates sub-objects separately. For example, the sub-objects may proceed along different paths. The system next advances to step 708. At step 708, the system recombines the sub-objects into the original object. The system next advances to step 710 which is an end state. The above-mentioned sequence of operations produces an interesting visual effect in which an object can be divided into sub-objects which fly apart and follow their own paths to eventually recombine into the original object.

Applications of the Object Decomposition Technology

I. Browser-Based Text Animation Design

Figure 8:
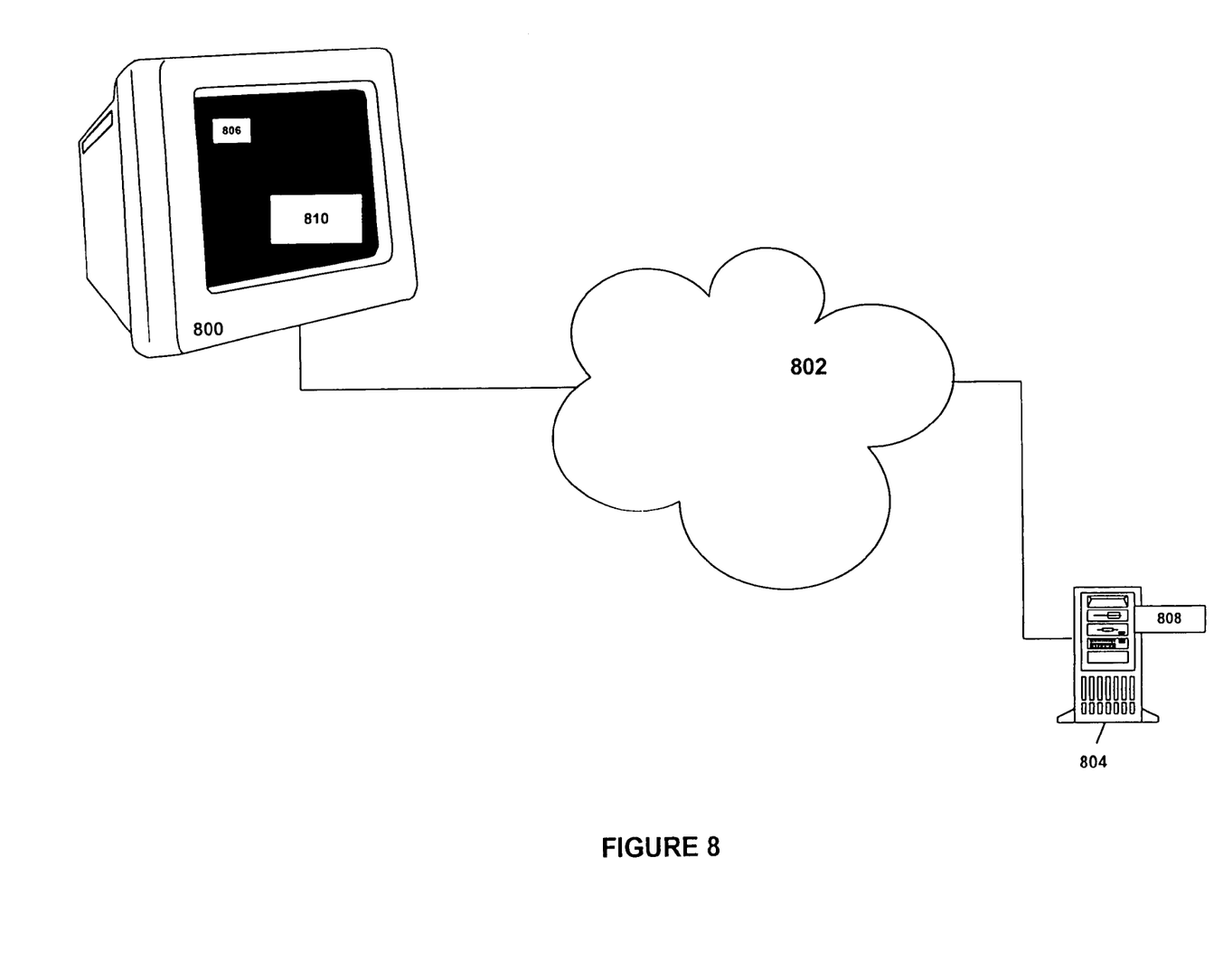
FIG. 8 is a diagram illustrating the architecture of a web-based animation system in accordance with an aspect of the present invention.

The present invention may be used to enable users to create text animation via web browsers. The architecture of the web based text animation system is illustrated in FIG. 8. A web browser 800 is accessed by a user. The web browser accesses a web server 804 via the Internet 802. The web server 804 is coupled to a text animation engine 808 that enables the user to create the text animation.

To facilitate the animation of text by the widest number of Internet users, the creation of the animated text should be as efficient as possible. A user should be able to animate text via the browser 800, preferably by performing no more than one mouse click per animation created. Moreover, the animation system should not require the installation of a plug-in to the browser 800, The browser-base text animation tool should also address the following issues:

The tool should separate the description of the animation from the text to which the animation is applied (text object);

The tool should describe the animation in a way that is independent of the content of the text object;

The tool should define the parts of the animation that can be controlled by the user for a given animation.

The tool should take into account the relative torpor of Internet connections in the design process.

The facilitation of web-based text animation also introduces secondary considerations which merit attention, such as:

The visual representation of the desired animation description should ease the creation of animated text by a user;

The system should be capable of applying an existing text animation example to a new text object with a different number of characters or words;

The system should include a process to adapt the time component of the animation depending on the number of characters of the text object;

The system should extend to non-alphabetical languages such as Kanji or Chinese characters.

An embodiment of the invention address the issues listed above as follows:

a. A behavior (called a Dance) is represented by a separate icon appearing on the web browser 800, and can be manipulated by the user as a separate object. The icon 806 can be manipulated on the browser 800 by drag-and-drop and cut-and-paste, and may be stored on a library of behaviors, or "Dances", via a window 810 appearing on the browser.

b. To apply a behavior to an object or a group of objects, the user simply drags a Dance icon 806 on top of the object or the group of objects (if these objects have been first included in the same "Group"). To perform multiple inheritance, the user simply drags and drops the Dances icon from two or more objects onto a single object. For example, an object A could inherit its motion path from an object B and its rotation along that path from an object C.

c. As an object receiving a behavior, or "Dance" may not have the same lifespan as the object that bore the original Dance, the various key frames of the original Dance should be adapted to the lifespan of the receiving object. The system presents several options to the user which emphasize different aspects of the Dance according to the user's preferences.

d. The concept is extended to the web by enabling the application of a Dance object to any text string entered by the user in an HTML form via the browser 800. The text strings are combined in a Template to create a customized animated text, which may be an ad banner, greeting card, postcard, business card, or other form of text.

e. The text animation engine resides on the Web server 804 and can operate without requiring the user to download any code or plug-in. It is designed to work with devices such as cell phones, palm computing devices, or any device capable of accessing the web through an embedded browser 800.

II. Dynamic Creation of an Animated Watermark

Dynamic Media Objects (DMOs) are used more and more widely to improve the user experience on a web site. Companies that sell Dynamic Media Objects have to protect themselves from the theft of these objects one they are displayed on a web page.

As it is not practical to prevent customers from copying DMOs displayed on the screen at any point in time, companies have been seeking ways to include a watermark in the DMOs in order to render them unusable for purposes other than demonstrations, or to facilitate authentication of stolen samples.

The problem addressed here is related to the situation where the DMO is customized with the viewer's information but is not to be copied by the viewer until some form of payment has been properly performed. It is necessary, however, to show a sample version of the DMO in a way that would entice the viewer to buy it.

If the watermarking process is too visible (or "obnoxious"), it might defeat the purpose of attracting the customer with high-quality customized content by interfering with the design integrity of the content. If the watermarking is too subtle, then it might not be enough of a deterrent to prevent illicit copies.

Existing methods for adding a watermark are based on encryption mechanisms and are compute intensive in order to increase the cost of tampering efforts. This heavy approach is not necessary for customized products which are created "just-in-time," as the process of creating the product provides an opportunity to embed watermark information in the product in a more effective way.

Several issues must be resolved when trying to protect an animated image with a watermark:

The resulting image should still be useful for the viewer, enabling the user to have an accurate idea of what then end result might be, when the watermark is removed. Only then can it be expected that the user will buy the sample.

A visual watermark in a DMO should not interfere with objects and colors used in the DMO. If the types of images vary widely, it can become quite difficult to ensure that a particular watermark will not hide a key element that the viewer wants to verify before they buy.

It should be difficult for the viewer to remove that watermark on his own. Indeed, it should be more costly for the viewer to try to circumvent the watermark than to purchase it directly.

Embodiments of the present invention allow the creation of a dynamic watermark by modifying a portion of the animated elements used in the Dynamic Media Object. The modifications are minor and do not fundamentally change the altered object but are sufficiently visible to prevent a commercial use of the result.

EXAMPLES

In an embodiment of the invention, animated text objects may be altered by replacing certain characters by a visibly different character of similar size or shape, in order to avoid altering the overall perception of the animated object.

In alternative embodiments, a graphic object might be altered by changing one sub-element in a way that is immediately apparent, without perturbing the animation of the full object. For instance, the head of an animated character could be replaced by a colored oval during the whole animation sequence, and this would serve as a watermark.

The embodiments described above meet the criteria listed for watermarks, as:

The resulting animation is still useful and recognizable by the viewer;

By altering the objects in place, the watermarking method avoids running into the problem of obfuscating elements of importance to the viewer;

As the alteration impacts all frames, it would require the unscrupulous user to fastidiously correct each frame individually in order to get rid of the watermark, and in many instances, the cost would be prohibitive compared to the benefit of obtaining the Dynamic Media Object without paying for it.

III. True Velocity Motion-Blur Method

To create animations with the appearance of "realism", animations should reproduce the imperfections of the real world, including the replication of perception based on the limitations of the past or existing technologies. For example, motion blur occurs automatically in a photograph of a fast moving object if the shutter speed is slow enough. As a result, observers associate speed with motion-blurred images, and motion-blurred images are desirable to depict speed in animations.

An embodiment of the invention includes a method for automatically determining the motion-blur effect from the actual velocity and actual motion path of each object during the animation. A fast-moving object will automatically have a longer trail than a slow moving object, and the trail will automatically take the shape of the path along which the object has traveled. The designer does not have to manually recreate the blurring effect object by object, and frame by frame.

In order to create a motion-blur effect, it is necessary to render each individual frame of an animation with information about the past instances of each object. The key problem is to determine the appropriate number of past instances to include in the computation. The creation of the motion-blur effect involves the resolution of the following issues:

What is the length of the motion blur effect?

What is the direction of the motion blur effect? What if the object moves along a curve in a rapid movement? In such a case, the trail should hug the actual path followed by the objective.

How can the blurring effect be applied to attributes other than spatial attributes, such as color, transparency, etc. . . . ?

An embodiment of the invention includes a solution based on the concept of simulating the actual phenomenon of taking a photograph with a slow shutter speed. For a shutter speed of say 1/10th of a second, and an animation at 30 frames per second, the motion blur will include three samples per frame.

The actual rendering of an object is then calculated by averaging the value of each pixel of the image from the values of the pixel in each of the three frames, and by limiting the calculation to the bounding box within which the object has evolved during the time the virtual shutter was open. Such averaging can be made with the RGB value of each pixel or by using any other color model, such as HLS, HIV or others.

The method is not limited to suing a linear average of the various samples, and can be extended to include any type of averaging, for example by giving a more important weight to the most recent sample, in order to simulate a faster faxing effect. One key advantage of this approach is to enable the rendering of a blurring effect due to the rapid change of color of a particular object, even if the object is positionally static. In other words, this method enables rendering of color blurring, transparency blurring, etc. . . .

When applied to rapidly changing text elements (as in Rapid Serial Visualization process, or RSVP, a particular method of Kinetic Typography), this blurring method enables additional effects akin to morphing: If a letter A is quickly replaced by a succession of letters such as B,C,D, then the rendering of the letter will display a blurring effect due to the shape differences of that set of characters. This effect is referred to as typographic blurring.

The issues listed earlier are solved naturally with this approach:

The length of the motion blue effect is automatically computed from the speed of motion of the object, the number of frames per second for the animation, and the shutter speed of the virtual camera;

The direction of the blurring effect is automatically rendered accurately because of the computation of the actual position of the object over time;

The blurring effect can be applied to any visual parameter that evolves in time during the animation.

IV. Legibility Enhancing Text Morphine Method

Embodiments of the invention support the morphing of text elements. In order to provide the best visual effect, it is important for the morphing process to keep the text legible as long as possible, even though it is distorted. Similarly, once the midpoint in the morphing process is crossed, it is important to for the text to become legible as soon as possible before the distorted text comes to its final form.

The difficulty of morphing characters comes from the desire to keep the morphed text legible as long as possible while the morphing operation takes place. In order to create the best possible visual effect, it is important to be able to determine automatically how best to pair morphing points from the start character to the end character.

To morph characters legibly, the following challenges need to be addressed:

If the start character has a different number of shapes than the end character, the distortion of the original character may be dramatic very quickly and the start character will be unreadable very quickly;

Each pair of characters has a different best inter-morphing sequence, and it is not easy to establish an automatic algorithm to find the best solution in each case.

Figure 9:
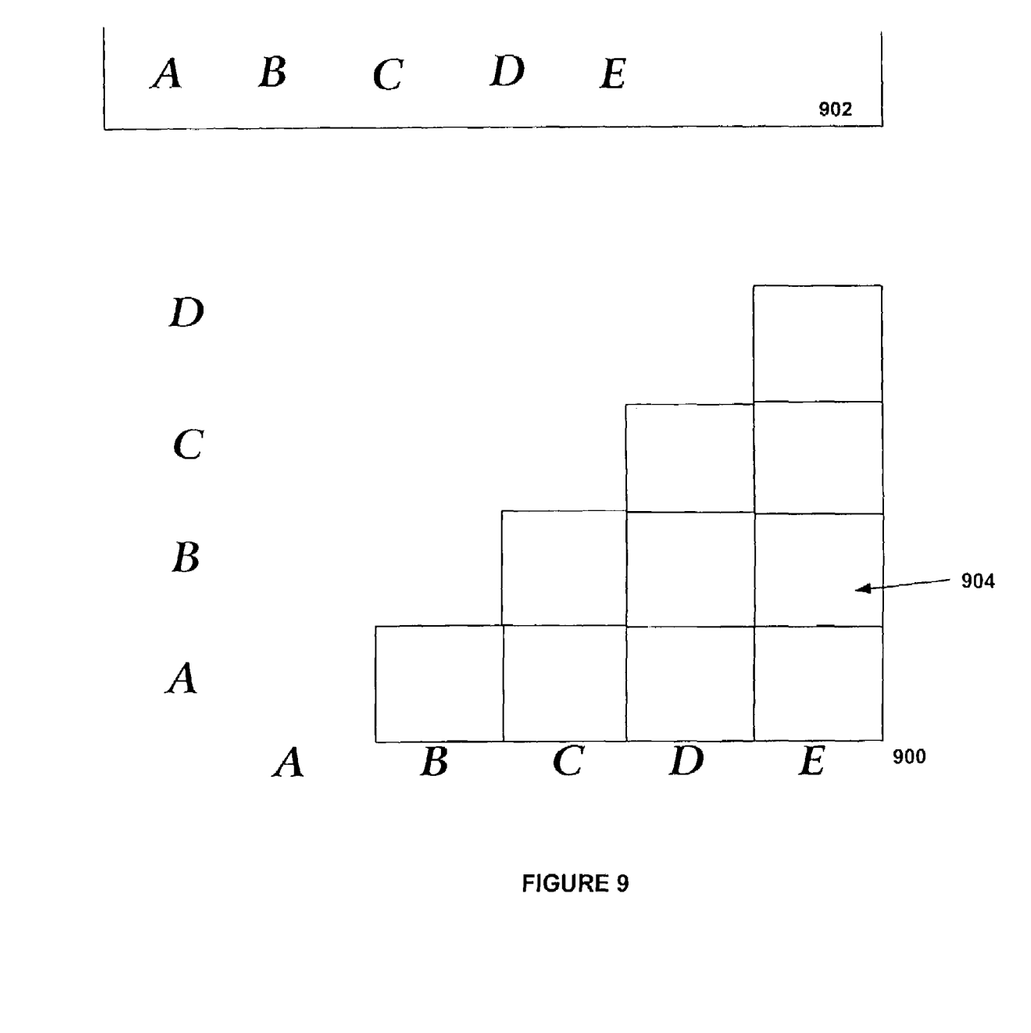
FIG. 9. is an illustration of a data structure used for text-morphing in accordance with an aspect of the present invention.

A solution to the challenges listed above is illustrated schematically in FIG. 9. Embodiments of the invention define a data structure 900 that is attached to each possible pair of characters within a font family 902. The data structure will define how each pair of characters can best morph into each other. In an embodiment of the invention, each pair of characters in the font family 902 is associated with an element 904 in the data structure 900 specifying an inter-morphing sequence. The data structure may be created directly by the font designer, or can be defined later on through a separate process for each existing font family. A data structure attached to a pair of characters within a font can also be used for two characters from an unprocessed font (i.e., a font which does not define how characters morph into each other) as a best-guess default information.

The legibility of the characters during the morphing sequence depends on parameters defining the start and end characters for the purpose of the morphing algorithm such as: relative positions, relative rotation angle, characteristic mapping. Because of this approach, the number of combinations to process in order to find the best morphing path is significantly reduced while consistently ensuring the best legibility during the process.

Figure 10:
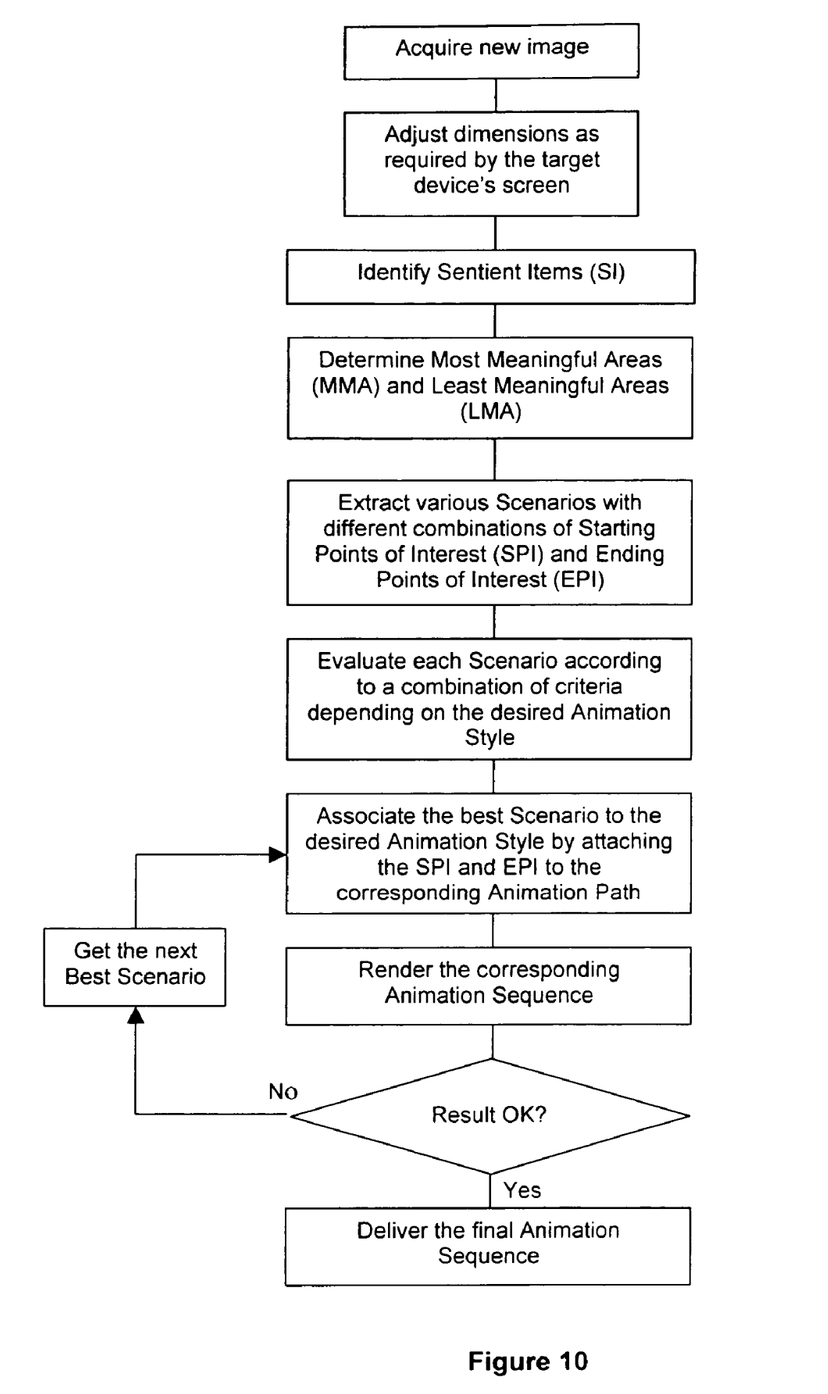
FIG. 10 is a flow chart illustrating the architecture of a web-based animation system in accordance with an aspect of the present invention.

FIG. 10 is a flowchart illustrating the sequence of operations involved in creating an animation effect in accordance with an aspect of the present invention. In order to address the stated constraints in a cost-effective fashion, it is proposed to analyze the image in order to extract at least the following types of information:

Sentient Item identification: A Sentient Item (SI) is a region of the image representing an individual, or an animal, or any other item that can logically be associated with a text comment;

Coarse grain pattern recognition: For each SI in the image, identify the most meaningful areas (MMA), i.e. certain physical characteristics with various degrees of accuracy such as: the general figure, the head, the forehead, the ears, the eyes, the mouth, etc. The location of the rectangular area enclosing each such characteristic will be referred to as a Point of Interest (PI);

Spatial image structure: Identify where the least meaningful areas (LMA) of the image are located in order to position the end of the animated text sequence most effectively. The location of the rectangular area enclosing each LMA is also referred to as a Point of Interest;

Scenario creation: Each PI can be a Starting Point of Interest (SPI) or an Ending Point of Interest (EPI) in relation with an Animated Text Sequence. In general, an MMA will be associated with an SPI, and an LMA will be associated with an EPI, but exceptions may occur. The various combinations resulting from this association constitute the collection of scenarios that are possible for the given image;

Scenario evaluation and scoring: Given the desired Text Animation Style, each Scenario is then evaluated along several criteria such as: distance between SPI and EPI, relative positioning between SPI and EPI, dimensions of the corresponding MMA and LMA. Scoring the Scenarios according to the evaluation function;

Render the Animated Image for each Scenario, starting with the one with the best evaluation score, and using an appropriate human interaction mechanism to determine the Scenario to retain.

Note that this whole sequence is designed to be possible without the need to do identity-matching. If such an algorithm is applied to certain images, it would enable additional benefits for certain applications.

By combining the results from the above commonly known image-processing algorithms with the invention's algorithmic description of an ATS, it is possible to obtain an effective solution to the problem described in the initial section.

Information as herein shown and described in detail is fully capable of attaining the above-described object of the invention, the presently preferred embodiment of the invention, and is, thus, representative of the subject matter which is broadly contemplated by the present invention. The scope of the present invention fully encompasses other embodiments which become obvious to those skilled in the art, and is to be limited, accordingly, by nothing other than the appended claims, wherein reference to an element in the singular is not intended to mean one and only one unless explicitly so stated, but rather one or more. All structural and functional equivalents to the elements of the above-described preferred embodiment and additional embodiments that are known to those of ordinary skill in the art are hereby expressly incorporated by reference and are intended to be encompassed by the present claims.

Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, various changes and modifications in form, material, and fabrication detail can be made without departing from the spirit and scope of the inventions as set forth in the appended claims should be readily apparent to those of ordinary skill in the art. No claim herein is to be construed under the provisions of 35 U.S.C. section 112, sixth paragraph, unless the element is expressly recited using the phrase "a means for".

INDUSTRIAL APPLICABILITY

The present invention applies industrially to computer-based animation methods. More particularly, the present invention applies industrially to hierarchical decomposition of visual and audio elements within a computer-generated animation to facilitate editing and creation of the animation and to add watermarking and annotations to the animation.

What is claimed:

1. A method of editing a sequence of an animated text sequence, the method comprising:
    identifying a sentient item that can logically be associated with a text comment;
    recognizing a coarse grain pattern by further identifying the most meaningful areas of the image and assigning to each such identified area the location of the rectangular area enclosing each such identified area hereafter referred to as a starting point of interest in order to position the start of the animated text effectively;
    further recognizing where the least meaningful areas of the image are located and the corresponding location of the rectangular area enclosing each such identified area hereafter referred to as an ending point of interest in order to position the end of the animated text sequence effectively;
    creating a scenario wherein each point of interest can be a starting point of interest or an ending point of interest in relation with an animated text sequence;
    evaluating said scenario evaluation along by choosing a criteria from the group of: distance between the starting point of interest and the ending point of interest, relative positioning between the starting point of interest and the ending point of interest, dimensions of the corresponding most meaningful area and least meaningful area;
    scoring said scenarios according to an evaluation function; and
    rendering the animated image for each scenario, starting with the one with the best evaluation score, and determining the scenario to retain and inputting a sequence of text characters from a form on a web browser.

2. A method of editing a sequence as in claim 1, wherein said animated text sequence is static.

* * * * *

UNITED STATES PATENT AND TRADEMARK OFFICE
CERTIFICATE OF CORRECTION

| | | |
|---|---|---|
| PATENT NO. | : 7,327,368 B2 | Page 1 of 1 |
| APPLICATION NO. | : 11/202465 | |
| DATED | : February 5, 2008 | |
| INVENTOR(S) | : Philippe Cailloux | |

It is certified that error appears in the above-identified patent and that said Letters Patent is hereby corrected as shown below:

Title Page, item (30) is deleted as follows:

~~Foreign Application Priority Data~~

~~Feb. 13, 2003 (DE) ............................. 203 02 344 U~~

Signed and Sealed this

Twenty-third Day of September, 2008

JON W. DUDAS
*Director of the United States Patent and Trademark Office*